United States Patent
Vandeberghe et al.

(10) Patent No.: US 6,357,813 B1
(45) Date of Patent: Mar. 19, 2002

(54) POWER OPERATED TAILGATE

(75) Inventors: David A Vandeberghe, Romeo; Richard T Thomson, Harrison Township, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/770,012

(22) Filed: Jan. 25, 2001

(51) Int. Cl.[7] .............................................. B62D 33/03
(52) U.S. Cl. ...................... 296/57.1; 296/146.4; 49/342
(58) Field of Search ............................ 296/57.1, 146.4, 296/146.8, 106; 49/341, 342

(56) References Cited

U.S. PATENT DOCUMENTS

| | | | | |
|---|---|---|---|---|
| 1,967,481 A | * | 7/1934 | Schaffert | 49/342 |
| 5,440,839 A | * | 8/1995 | Piltingsrud | 49/342 |
| 6,217,097 B1 | * | 4/2001 | Rogers, Jr. et al. | 296/57.1 |
| 6,241,300 B1 | * | 6/2001 | Suzuki | 49/341 X |

* cited by examiner

*Primary Examiner*—Stephen T. Gordon
*Assistant Examiner*—Jason Morrow
(74) *Attorney, Agent, or Firm*—Patricia M. Griffin

(57) ABSTRACT

A power tailgate assembly for mounting to the aft end of a vehicle, particularly a pickup truck or SUV, is disclosed. The power tailgate assembly of the present invention is capable of pivotally moving a tailgate between open and closed positions and generally comprises a tailgate, a control arm, and a motor. The tailgate is typically a flat panel piece hingedly attached to the aft end of the vehicle, as is commonly known in the art, and includes an elongated channel formed on one of the side ends of the tailgate. The control aim is a rigid elongated member pivotally connected to the vehicle which acts as a mechanical link between the motor and the tailgate and includes a sliding component located at one end and gear teeth located at the other end. The sliding component is designed to fit within the elongated channel of the tailgate, thereby creating a sliding connection between the control arm and the tailgate. The gear teeth extend from the control arm and mesh with complimentary shaped teeth located on an output gear of a reversible electric motor. In operation, activation of the motor causes the gear teeth of the motor to mesh with the gear teeth of the control arm, thereby pivoting the control arm about a pivot axis. As the control arm pivots, the sliding component moves within the elongated channel and pivots the tailgate between open and closed positions.

8 Claims, 2 Drawing Sheets

POWER OPERATED TAILGATE

TECHNICAL FIELD

This invention relates to vehicles, particularly pickup trucks and Sport Utility Vehicles (SUVs), having a hinged tailgate that is connected to the aft end of the vehicle and is operated by an electric motor.

BACKGROUND OF THE INVENTION

Pickup trucks and SUVs often have tailgates that are hinged at the bottom and connected to the aft end of the vehicle. Commonly, these tailgates are manually opened and closed to provide access to a cargo area located at the aft end of the vehicle and located between two laterally spaced walls. In the closed position, the tailgate is secured to the vehicle via fork-bolt type latches on each side of the tailgate that engage cooperative striker pins extending from the laterally spaced walls. To lower the tailgate, which is fairly heavy, an operator must first unlatch the fork-bolts by engaging a handle, then lower the tailgate to an open position, a two-handed process for most operators. This two-handed process is further complicated when the operator is carrying items, such as groceries or garment bags, as the operator has no available hands to operate the tailgate. Once the items are loaded or unloaded, the tailgate must be raised to a closed position and slammed into place such that the fork bolts securely latch to the striker pins. Consequently, the manual operation of a vehicle tailgate is inconvenient at the least and often times very difficult.

Vehicle tailgates commonly include an additional lock mechanism that must be unlocked before the tailgate can be unlatched and lowered to the open position. The lock mechanism requires added engagement by the operator, thereby adding to the inconvenience and difficulty of manually operating the tailgate.

Accordingly, it would be advantageous to provide a power operated tailgate capable of unlatching itself and moving between open and closed positions under the power of an electric motor.

SUMMARY OF THE INVENTION

The present invention provides a vehicle having a power tailgate assembly including a tailgate, a control arm, and a motor. The tailgate has an elongated channel and hinges that pivotally connect the tailgate to the vehicle for movement between an open and closed position. The control arm is pivotally connected to the vehicle about a pivot axis and has an arm section with an attachment component that couples the arm section to the elongated channel of the tailgate. The control arm also includes a gear section having gear teeth. The motor has an output gear with gear teeth that mechanically engage the gear teeth of the control arm, such that rotation of the output gear causes the control arm to pivot and move the tailgate between the open and closed positions.

BRIEF DESCRIPTION OF THE DRAWINGS

The preferred embodiment of the present invention is disclosed in the following description and in the accompanying drawings, wherein.

DETAILED DESCRIPTION OF THE PREFERRED EMBODIMENT

Figure 1:
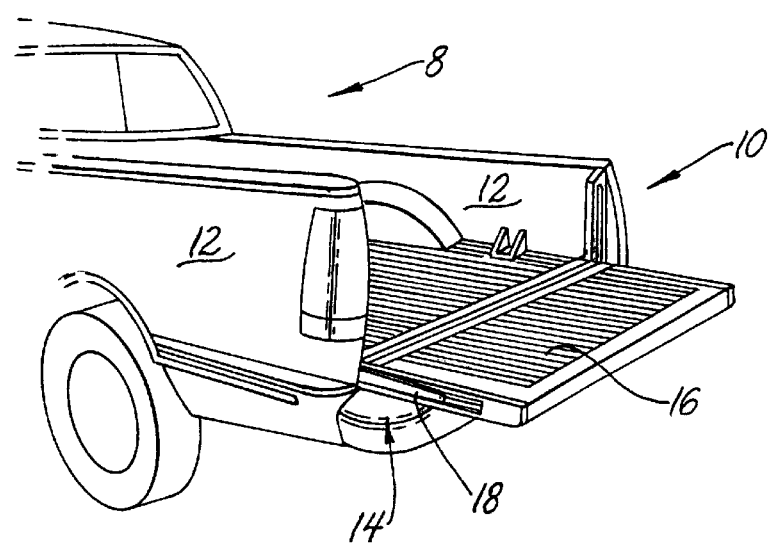
FIG. 1 is a perspective view of the aft end of a vehicle equipped with the power tailgate assembly of the present invention and showing the tailgate in the open position.

Referring to the drawings, an exemplary embodiment of the power tailgate assembly of the present invention will now be described in connection with its use on a vehicle.

Figure 2:
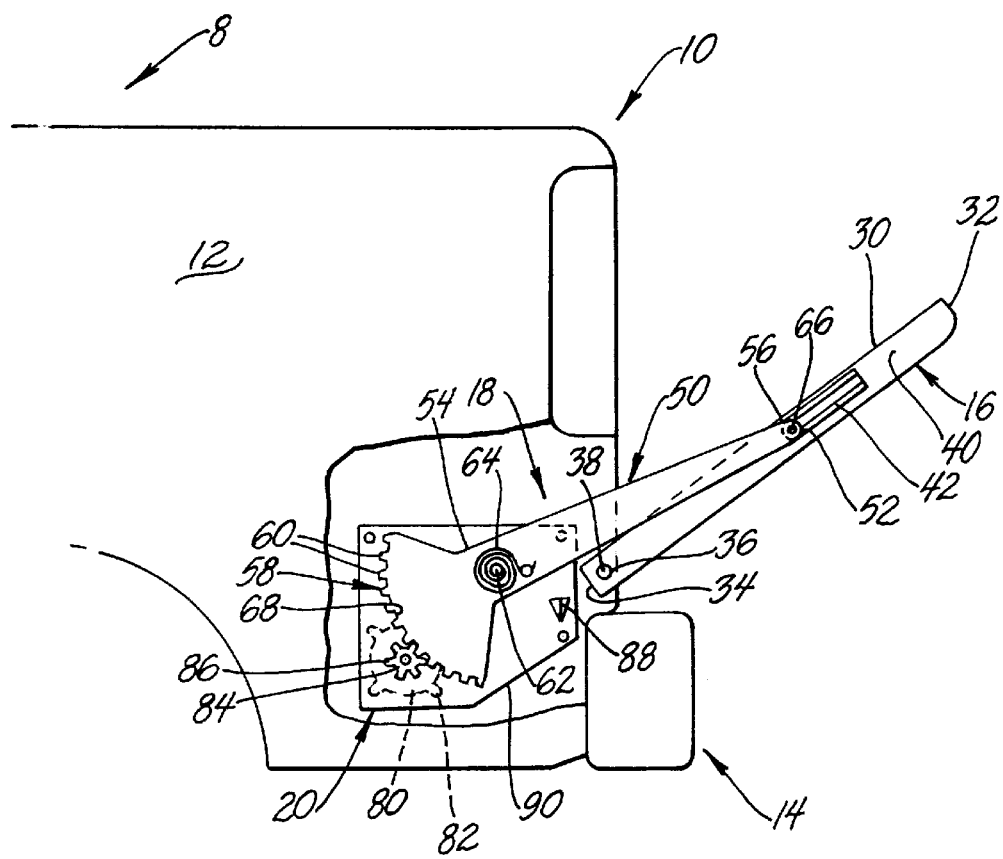
FIG. 2 is an enlarged fragmentary side view of the aft end of the vehicle of FIG. 1 showing the tailgate in between the open and closed positions.

Referring to FIGS. 1 and 2, there is shown a vehicle 8 having an aft end 10 with two laterally spaced walls 12 that is equipped with a power tailgate assembly 14 hingedly attached to the vehicle for pivotal movement between an open and a closed position. The power tailgate assembly 14 generally includes a tailgate component 16, a control arm 18, and an electric motor assembly 20. The tailgate 16 is typically a flat panel piece that extends the width of the aft end of the vehicle and is fitted with hinges for pivotal attachment to the vehicle, such that the tailgate may pivot between the open and the closed position, as is commonly known in the art. Additionally, the tailgate 16 includes at least one elongated channel 42 for establishing a sliding connection with the control arm 18. The control arm is a solid elongated member mechanically linked to both the tailgate 16 and the electric motor 20. One end of the control arm slidably connects to the elongated channel 42 of the tailgate component 16, while the other end of the control arm is fitted with gear teeth 60 designed to mesh with an output gear 84 of the electric motor 20. The electric motor 20 is preferably a reversible electric motor equipped with an extending output gear 84 that engages the previously mentioned gear teeth 60 of the control arm 18, such that rotation of the output gear causes a proportional pivot of the control arm. In use, an operator activates the electric motor 20, via a switch, key fob, or other appropriate device, which produces a rotational movement of the output gear 84 and consequently a pivotal movement of the control arm 18 about its pivot axis 62. As the control arm 18 pivots, the end of the control arm that contacts the elongated channel 42 slides within the channel and exerts a force on the tailgate 16, thereby moving the tailgate between the open and the closed position. Accordingly, rotational movement of the output gear 84 causes a pivotal movement of the control arm 18 and hence determines the position of the tailgate 16.

Figure 3:
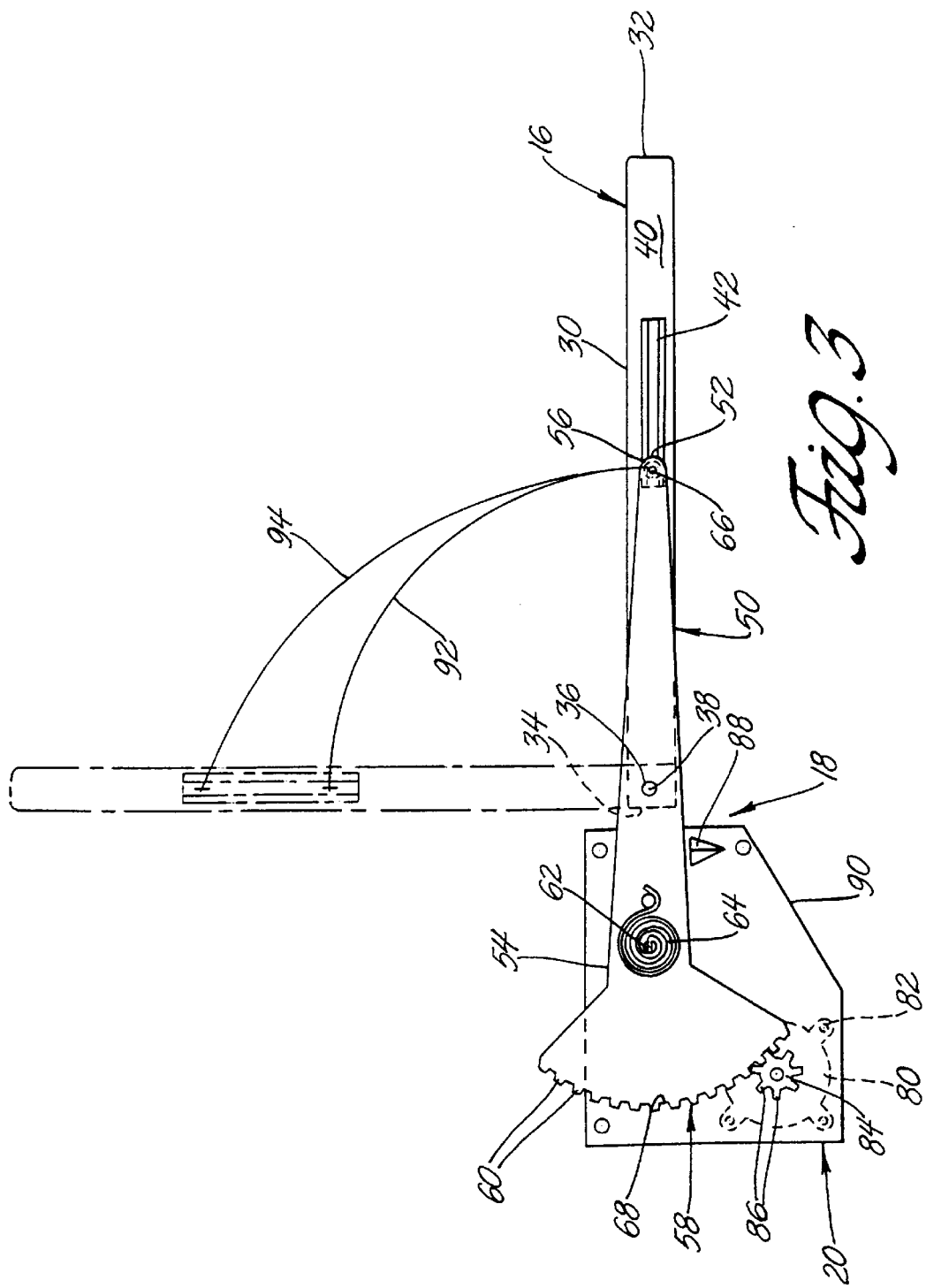
FIG. 3 is an enlarged side view of the power tailgate assembly of the present invention showing the power tailgate assembly in the open position.

Referring now to FIGS. 2 and 3, the tailgate 16 is of the type commonly found on pickup trucks and SUVs and includes a main panel section 30, an upper end 32, a lower end 34, hinges 36, a hinge axis 38, side ends 40, and an elongated channel 42. The main panel section 30 is a generally rectangular, flat panel piece having parallel upper and lower ends 32, 34. The upper and lower ends expand the width of the tailgate 16, which is slightly shorter than the width of the aft end of the vehicle 8. Hinges 36 are mounted near the lower end 34 of the tailgate 16, either along the lower end or on the side ends 40, and pivotally cooperate with hinges mounted to the aft end of the vehicle. This hinged relationship between the tailgate 16 and the vehicle 8 allows the tailgate to pivot between a fully open position, as shown in FIG. 3, and a fully closed position, not shown. It should be noted, hinges 36 may be of the kind which allow the tailgate to be removed by the operator, as well as the kind that creates a permanent connection between the tailgate and the vehicle. Hinge axis 38 is located near and parallel to the tailgate lower end 34, and is the axis about which the tailgate pivots. The tailgate 16 further includes two side ends 40 that extend the height of the tailgate, are parallel to each other, and are perpendicular to the lower and upper ends 34, 32. The tailgate may either have a single elongated channel 42 located on one side end 40, or an elongated channel located on each side end. The elongated channels 42 are relatively narrow grooves formed along the side ends 40 and are designed to receive a cooperating element of the control arm 18. Each of the elongated channels 42 is recessed from the outer surface of the side end 40 and is designed to receive an element of the control arm 18, thereby mechanically connecting the tailgate and the control arm together.

The control arm 18 acts as a mechanical link between the electric motor 20 and the tailgate 16 and translates the rotational movement of the motor to a mechanical force exerted on the tailgate, thereby pivotally moving the tailgate between the open and closed positions. The control arm is an elongated rigid member having an arm section 50, an outward arm end 52, an inward arm end 54, a sliding component 56, a gear section 58, gear teeth 60, a pivot axis 62, and a spiral spring 64. The arm section 50 is a long stiff member extending from an inward arm end 54 to an outward arm end 52. The sliding component 56 is rotatably fixed to a point on the outward arm end 52 such that the sliding component is securely fastened to the arm section 50, but is free to spin about an axis 66. At the opposite end of the arm section, inward arm end 54 is integrally formed to the gear section 58 to form a unitary control arm 18. Alternatively, the arm and gear sections could be formed separately and connected together via some fastening means. The gear section 58 resembles a fraction of a flat circular disk, or analogously, a pie having missing pieces. The gear section includes a circumferential edge 68 having gear teeth 60 extending from its periphery. These gear teeth are designed to mesh with gear teeth located on the output gear 84 of the motor, thereby allowing the control arm to pivot under the control of the motor. While FIGS. 2 and 3 depict the gear section as approximately 120° of a full disk, the gear section could alternatively be of a greater or lesser angular size. Pivot axis 62 is located at the center of the gear section and rotatably connects the entire control arm to the vehicle via some type of rotational mounting device, such as a small axle or pivot pin. As can be seen from the figures, the pivot axis 62 is equidistant to every point along the circumferential edge 68, thereby allowing the gear section to freely rotate about the pivot axis while maintaining a uniform contact with the gear teeth of the output gear 84. Spiral spring 64 is mounted proximate the pivot axis 62 and exerts a rotational force on the control arm 18 which biases the control arm in an upward direction towards the closed position counterclockwise as seen in FIGS. 2 and 3). Thus, the control arm 18 rotates from the open position to the closed position about the pivot axis 62 under the power of the electric motor 20 and against the bias of the spiral spring 64, and is mechanically coupled to the motor via complimentary gear teeth extending from both components.

The motor assembly 20 is preferably a reversible electric motor unit controlled by a suitable motor controller and generally comprises an electric motor 80, motor mounts 82, an output gear 84, a control arm stop 88, and a motor housing 90. A number of motor controllers, such as limits switches, are suitable for controlling the motor of the present invention, as is well known in the art. The actual electric motor 80 is located within a protective outer casing, referred to as the motor housing 90. The motor mounts 82 extend from the electric motor and provide holes for receiving a bolt, or the like, used to securely fasten the motor assembly 20 to one of two laterally spaced walls 12 located at the aft end of the vehicle. Formed on the outside surface of the motor housing is a control arm stop 88, which is designed to extend outwardly from the housing and prevent the control arm from pivoting downward any further. Control arm stop 88 decreases the stress on the motor due to the weight of the tailgate by providing a ledge for the control arm 18 to rest on. The output gear 84 is a generally cylindrical member that extends away from the electric motor and includes circumferential gear teeth 86 that are designed to mesh with the gear teeth 60 of the gear section 58. As seen in FIG. 3, a clockwise rotation of the output gear 84 causes the control arm 18 to pivot about the pivot axis 62 in a counterclockwise direction, thereby moving the tailgate towards the closed position. A counterclockwise rotation of the output gear produces precisely the opposite effect. It should be noted, numerous types of motors having varying degrees of power may be used for this application.

As will be appreciated, in the absence of a rotational force from the electric motor, there are still several forces at work attempting to bias the tailgate towards various positions. Firstly, as previously mentioned, the spiral spring 64 exerts a rotational force on the control arm 18 which pivotally biases the control arm and hence the tailgate towards the closed position, counterclockwise as seen in FIG. 3. Secondly, the weight of the tailgate itself exerts a downward gravitational force upon the control arm 18 that biases the control arm, and hence the tailgate 16, to the open position, clockwise as seen in FIG. 3. Thus, these two forces offset each other to a certain extent.

The power tailgate assembly 14 of the present invention has two primary modes of operation, an opening mode and a closing mode. In the opening mode operation, the tailgate begins in a closed position securely fastened to the laterally spaced walls 12 located at the aft end of the vehicle. A common mechanism for securing the tailgate in the closed position includes fork-bolt type latches located on each side of the tailgate component that engage cooperative striker pins extending from each of the laterally spaced walls. Upon operator activation, the latches or other fastening mechanism releases the tailgate so it is free to pivot about hinge axis 38. Once the tailgate is free to pivot, the electric motor 20 is energized, thereby producing a counterclockwise rotation of the output gear 84 and hence the gear teeth 86. The previously mentioned motor controller determines if the electric motor is in an opening or closing mode, and consequently determines the direction of rotation, as is well known in the art. Gear teeth 86 mesh with the complimentary sized gear teeth 60 of the control arm causing the control arm 18 to pivot about the pivot axis 62 in a clockwise direction, against the rotational bias of the spiral spring. The sliding component 56 of the control arm is designed to attach to the elongated channel 42 such that it is free to slide up and down within the channel. As the control arm pivots in the clockwise direction, it pulls the tailgate 16 such that the tailgate pivots about the hinge axis 38 towards the open position. As seen in FIG. 3, the control arm and the tailgate do not share a common pivot axis. Pivot axis 62 of the control arm is laterally spaced to the left of the hinge axis 38 of the tailgate, thus, the purpose of the elongated channel and sliding component is established. Because the sliding component 56 is affixed to the end of the control arm 18 the sliding component is always equidistant to pivot axis 62, regardless of the angular position of the control arm. This is illustrated by the control arm arc 94 which is representative of the angular path the sliding component 56 follows when pivoting between the open and closed positions. On the other hand, tailgate arc 92 is representative of the path of a particular point in the elongated channel 42 as the tailgate pivots between open and closed positions. Because the two arcuate paths diverge from each other, it is necessary to have a control arm/tailgate connection point that changes its location in relation to at least one of the two pivot axis. In this particular embodiment, the control arm/tailgate connection point remains equidistant to the pivot axis 62, but the distance to the hinge axis 38 varies as the control arm is pivoted. The control arm/tailgate connection point, which may be defined as the point of contact between the sliding component and the elongated channel, is closest to the hinge axis 38 when the tailgate is in the open position, as seen in FIG. 3, and furthest from the hinge axis when in the closed position. It should be recognized, that the present invention could be configured such that the control arm/tailgate connection point is equidistant in relation to the hinge axis 38 and moves in relation to pivot axis 62. In such case, the tailgate would have some single, stationary connection point and the control arm would have some type of elongated channel that causes the connection point to stay equidistant in relation to the hinge axis 38 but varies in relation to the pivot axis 62 as the control arm pivots. In this scenario, the control arm/tailgate connection point would be closest to the pivot axis 62 when the tailgate was in the closed position and furthest from the pivot axis when the tailgate was in the open position. Regardless of which control arm/tailgate connection point is used, when the tailgate 16 reaches the open position, the control arm rests upon the control arm stop 88, thereby relieving the downward pressure on the motor and other components. Once in the open position, the tailgate remains there until acted upon by either manual force or the power of the motor.

In the closing operation, the power tailgate assembly undergoes virtually the reverse process as that previously described in the opening operation. When activated by an operator, the motor is again energized and produces a clockwise rotational output of the output gear 84. The gear teeth 86 of the output gear mesh with those of the control arm and pivot the control arm in a counterclockwise direction. This pivoting is aided by the rotational bias of the spiral spring 64, as previously mentioned, and is inhibited by the weight of the tailgate. Once the tailgate 16 reaches the closed position, a fastening mechanism receives the tailgate and secures it in place with relation to the vehicle.

Please note, the present invention offers several advantages over the prior art. Firstly, the present invention provides an advantage over manual tailgate assemblies by providing an operator with a power tailgate assembly that allows the operator to open and close the tailgate when they have no available hands, as is the case when they are carrying items. The present invention also allows the operator to open or close the tailgate from a remote location, such as when an operator remains inside of the vehicle and opens the tailgate for another person. Furthermore, the present invention provides an advantage over other power tailgate assemblies by utilizing the sturdiness and ruggedness of the control arm configuration previously described, as well as being able to minimize costs due to the close similarity that this control arm shares with commonly known designs, such as window regulators.

Obviously, many modifications and variations of the present invention in light of the above teachings may be made. Therefore, it is to be understood that within the scope of the appended claims, the invention may be practiced otherwise than as specifically described.

We claim:

1. A vehicle having a power tailgate assembly, comprising:
    a tailgate having a lower end, side ends, hinges proximate the lower end that pivotally connect the tailgate to the vehicle for pivotal movement between an open and a closed position, and an elongated channel located on at least one of the side ends,
    a control arm pivotally connected to the vehicle about a pivot axis and having an arm section with an attachment component for coupling the arm section to the elongated channel with sliding movement, and a gear section connected to the arm section and having gear teeth, and
    a motor having an output gear with gear teeth that mechanically engage the gear teeth of the gear section such that rotation of the output gear causes the control arm to pivot about the pivot axis, thereby moving the tailgate between the open and the closed positions.

2. The vehicle as defined in claim 1, further including a frame mounted to the vehicle such that the frame substantially surrounds and thereby protects the motor.

3. The vehicle as defined in claim 2, wherein the frame includes a stop that engages the control arm when the tailgate is in the open position.

4. The vehicle as defined in claim 1, wherein the attachment component is rotatably attached to the control arm such that the attachment component moves along the length of the elongated channel.

5. The vehicle as defined in claim 1, wherein the pivot axis is located proximate the gear section.

6. A vehicle having a power tailgate assembly, comprising:
    a tailgate having an elongated channel and hinges that pivotally connect the tailgate to the vehicle for pivotal movement between an open and a closed position,
    a control arm pivotally connected to the vehicle about a pivot axis and having an arm section with an attachment component for coupling the arm section to the elongated channel for sliding movement with respect to the tailgate, a gear section that is connected to the arm section that has gear teeth, and a spiral spring biasing the control arm about the pivot axis such that the tailgate is urged toward the closed position, the pivot axis being proximate the gear section, and, a motor having an output gear with gear teeth that mechanically engage the gear teeth of the gear section such that rotation of the output gear causes the control arm to pivot about the pivot axis, thereby moving the tailgate between the open and the closed positions.

7. The vehicle as defined in claim 1, wherein the motor is operable to work in both a forward and a backward direction.

8. A vehicle having a pair of laterally spaced walls and a power tailgate assembly at a rear end of the laterally spaced walls, comprising:

a tailgate including a main panel section having a lower end and side ends, hinges that are fastened proximate the lower end for pivotal connection to the vehicle, and an elongated channel located on at least one of the side ends, the tailgate being able to pivot between an open and a closed position, a control arm having an arm section with an inward arm end and an outward arm end, a sliding component fastened proximate the outward arm end for establishing a slidable connection to the elongated channel, a gear section connected to the inward arm end and having gear teeth along a circumferential edge, the control arm being pivotally mounted on one of the pair of laterally spaced walls for movement about a pivot axis, a spiral spring biasing the control arm about the pivot axis such that the tailgate is urged toward the closed position, and a motor mounted on one of the laterally spared walls, the motor having an output gear with gear teeth that mesh with the gear teeth of the gear section such that rotation of the output gear causes the control arm to pivot about the pivot axis, thereby moving the tailgate between the open position and the closed position.

* * * * *